United States Patent [19]
Doyle et al.

[11] Patent Number: 5,764,205
[45] Date of Patent: Jun. 9, 1998

[54] PICTURE DISPLAY AND SELECTION DRIVER AND INTEGRATED DRIVER CIRCUIT FOR USE IN SUCH A PICTURE DISPLAY DEVICE

[75] Inventors: Terence Doyle; Nicolaas Lambert; James J. A. McCormack; Franciscus A. C. M. Schoofs; Dirk J. A. Teuling, all of Eindhoven, Netherlands

[73] Assignee: U.S. Philips Corporation, New York, N.Y.

[21] Appl. No.: 712,952

[22] Filed: Sep. 12, 1996

Related U.S. Application Data

[63] Continuation of Ser. No. 249,417, May 26, 1994, abandoned.

[30] Foreign Application Priority Data

May 28, 1993 [EP] European Pat. Off. ............... 93201537
Mar. 29, 1994 [EP] European Pat. Off. ............... 94200824

[51] Int. Cl.$^6$ ........................................................ G09G 3/22
[52] U.S. Cl. ................................ 345/75; 345/47; 345/211
[58] Field of Search ............................... 345/47, 74, 75, 345/211, 213, 214; 315/167–169.4

[56] References Cited

U.S. PATENT DOCUMENTS 4,196,413  4/1980  Sowa .......................................... 345/75

FOREIGN PATENT DOCUMENTS

| 0400750 | 12/1990 | European Pat. Off. | ......... H01J 31/12 |
| 0436997 | 7/1991 | European Pat. Off. | ......... H01J 31/12 |
| 4-128871 | 4/1992 | Japan | ......................................... 345/47 |
| 5-257121 | 10/1993 | Japan | ....................................... 345/211 |

*Primary Examiner*—Jeffery Brier
*Attorney, Agent, or Firm*—Robert J. Kraus

[57] ABSTRACT

Picture display device comprising a plurality of electron transport ducts or transporting electrons in the form of electron currents, and selection electrodes for withdrawing each electron current at predetermined locations from its transport duct and for directing said current towards a luminescent screen. The selection electrodes are driven by a selection driver comprising integrated driver circuits having outputs which are DC-coupled to the selection electrodes and are cascaded as regards their power supply voltages in such a way that they apply both selection pulses and transport (bias) voltage to the selection electrodes.

8 Claims, 8 Drawing Sheets

PICTURE DISPLAY AND SELECTION DRIVER AND INTEGRATED DRIVER CIRCUIT FOR USE IN SUCH A PICTURE DISPLAY DEVICE

This is a continuation of prior application Ser. No. 08/249,417, filed on May 26, 1994 now abandoned.

BACKGROUND OF THE INVENTION

The invention relates to a picture display device having a selection structure for the passage of electrons via extraction locations which communicate row by row with electron transport ducts and with selection electrodes associated with the extraction locations and being coupled to a selection driver.

A picture display device of this type is described in European Patent Application no. 92204007.6, corresponding to U.S. patent application Ser. No. 08/373,917, and may comprise a display unit of the flat-panel type as disclosed in European Patent Applications EP-A 0 400 750 and EP-A 0 436 997. Display units of the flat-panel type are constructions having a transparent face plate and, arranged at a small distance therefrom, a rear plate, which plates are interconnected by means of partitions and in which the inner side of the face plate is provided with pixels in the form of a phosphor pattern, one side of which is provided with an electrically conducting coating (the combination also being referred to as luminescent screen). If (video information-controlled) electrons impinge upon the luminescent screen, a visual image is formed which is visible via the front side of the face plate. The face plate may be flat, or if desired, curved (for example, spherical or cylindrical).

The display unit described in European Patent Applications EP-A 0 400 750 and EP-A 0 436 997 comprises a plurality of juxtaposed sources for emitting electrons, local electron transport ducts cooperating with the sources and each having walls of high-ohmic, electrically substantially insulating material having a secondary emission coefficient suitable for transporting emitted electrons in the form of electron currents and a selection structure comprising selectively energizable electrodes (selection electrodes) for withdrawing each electron current from its transport duct at predetermined extraction locations facing the luminescent screen, while further means are provided for directing extracted electrons towards pixels of the luminescent screen for producing a picture composed of pixels.

The operation of this known display unit is based on the recognition that electron transport is possible when electrons impinge on an inner wall of an elongate evacuated cavity (referred to as "compartment") defined by walls of a high-ohmic, electrically substantially insulating material (for example, glass or synthetic material), if an electric field of sufficient power is generated in the longitudinal direction of the "compartment" (by applying an electric potential difference across the ends of the "compartment"). The impinging electrons then generate secondary electrons by wall interaction, which electrons are attracted to a further wall section and in their turn generate secondary electrons again by wall interaction. The circumstances (field strength E, electrical resistance of the walls, secondary emission coefficient $\delta$ of the walls) may be chosen to be such that a substantially constant vacuum current will flow in the "compartment".

Starting from the above-mentioned principle, a flat-panel picture display unit can be realised by providing each one of a plurality of juxtaposed "compartments", which constitute transport ducts, with a column of extraction apertures at a side which is to face a display screen. It will then be practical to arrange the extraction apertures of adjacent transport ducts along parallel lines extending transversely to the transport ducts. By associating selection electrodes arranged in rows with the arrangement of apertures, which selection electrodes are energizable by means of a first (positive) electric voltage (pulse) for withdrawing electron currents from the "compartments" via the apertures of a row, or which convey a second (lower) electric voltage if no electrons are to be locally withdrawn from the "compartments", an addressing means is provided with which electrons withdrawn from the "compartments" can be directed towards the screen for producing an image composed of pixels by activating the pixels.

Together with said pulses, a bias voltage or transport voltage (=the above-mentioned second electric voltage) increasing with the position in the transport ducts is to be applied to the selection electrodes so as to realise the transport of electrons in the transport ducts. In practice, this transport voltage may be approximately 100 V/cm so that a total transport voltage of 3 kV is required for a flat-panel display unit having a height of, for example 30 cm (with one cathode at one side of the panel).

It is known from the above-mentioned European Patent Application 92204007.6 (PHN 13.963) to generate the selection pulses by means of a selection driver having an output for each selection electrode which is coupled to the relevant selection electrode via a coupling capacitor, and a resistance ladder for supplying a bias voltage increasing with the position across the length of the transport ducts. However, a considerable drawback of this known picture display device is the large number of required coupling capacitors, all of which must have a comparatively large capacitance (several nF) and withstand a high insulation voltage of several kV, while the values of the ladder resistors should also be within narrow tolerances.

The Applicant's prior European Patent Application 94200516.6, corresponding to U.S. patent application Ser. No. 08/249,426, proposes a number of measures for alleviating the insulation requirements to be imposed on the coupling capacitors and the tolerance requirements to be imposed on the ladder resistors to a considerable extent, although the large number of components required nevertheless involves considerable costs.

SUMMARY OF THE INVENTION

It is an object of the present invention to obviate said drawbacks of the known picture display devices which have already been proposed and to this end the picture display device according to the invention is characterized in that the selection driver comprises a multiple of integrated driver circuits each having outputs for supplying selection pulses, each output being DC-connected to a selection electrode, and in that the integrated driver circuits are cascaded as regards their power supply voltages in such a way that the bias voltage required for the electron transport in the transport ducts is also applied to the connected selection electrodes. It is to be noted that an integrated driver circuit is cascaded as regards its power supply voltages when power supply terminals of the integrated driver circuit are at a higher voltage level than corresponding power supply terminals of an integrated driver circuit which is lower in the cascade.

A first type of picture display device according to the invention, in which a minimum quantity of power supply terminals is used, is characterized in that each integrated driver circuit comprises at least one integrated voltage divider and in that bias voltages applied to the selection electrodes are generated partly by power supply voltages applied to the integrated driver circuit via power supply terminals and partly by the integrated voltage divider.

A further type of picture display device according to the invention, in which a decrease of the dissipated power is achieved, is characterized in that the outputs of the integrated driver circuits are subdivided into a plurality of groups of output stages, the output stages associated with one group applying mutually equal bias voltages to a group of consecutive selection electrodes, and consecutive groups of output stages deriving consecutive values of bias voltages from power supply terminals and applying these values to consecutive groups of selection electrodes.

Such a picture display device is preferably further characterized in that each integrated driver circuit comprises a plurality of groups of output stages which are cascaded as regards bias applied to said circuits.

In order to realise a (further) considerable reduction of the power dissipation, a picture display device according to the invention may be further characterized in that said power supply terminals of the integrated driver circuits are decoupled for alternating current by means of decoupling capacitors.

Another aspect of a picture display device according to the invention is characterized in that the integrated driver circuits have a control signal input for supplying control signals which control the instant of occurrence of the selection pulses at the outputs of the integrated driver circuits, while the integrated driver circuits are preferably cascaded as regards the control signals and have control signal outputs for supplying delayed and DC-offset control signals to the control signal input of an integrated driver circuit which is next in the cascade.

The invention also relates to a selection driver for use in a picture display device according to the invention and to an integrated driver circuit for use in such a picture display device.

These and other aspects will be apparent from and elucidated with reference to the embodiments to be described hereinafter.

DESCRIPTION OF THE PREFERRED EMBODIMENTS

Figure 1A:
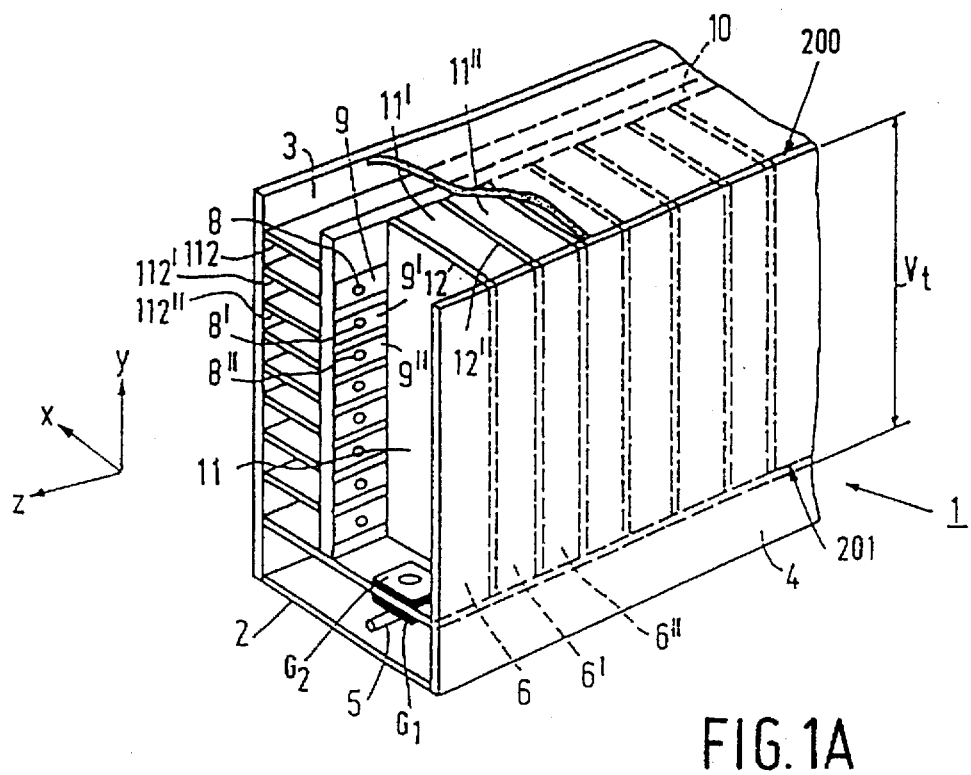
FIG. 1A is a diagrammatic perspective elevational view, partly broken away, of a display unit as can be used in a display device according to the invention.
Figure 1B:
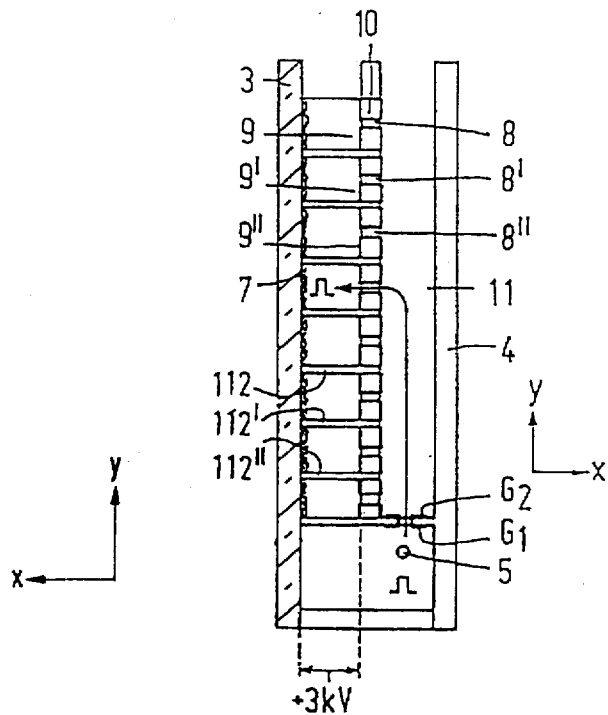
FIG. 1B is a cross-section through a display unit of FIG. 1A.

FIGS. 1A and 1B shows a flat-panel display unit 1 of a picture display device according to the invention, having a display panel (window) 3 comprising a transparent face plate and a luminescent screen and a rear wall 4 located opposite said panel. A luminescent screen 7 having a repetitive pattern (rows or dots) of, for example triplets of red (R), green (G) and blue (B) luminescing phosphor elements (or monochrome elements) is arranged on the inner surface of window 3. To be able to supply the required high voltage, the luminescent screen 7 is either arranged on a transparent, electrically conducting layer (for example, indium-tin oxide) or is provided with an electrically conducting layer (for example, Al backing). In a preferred embodiment the (dot-shaped) phosphor elements of a triplet are located at the vertices of a substantial isosceles/equilateral triangle.

An electron source arrangement 5, for example a line cathode which by means of drive electrodes provides a large number (for example, several hundred) of electron emitters or a similar number of separate emitters, is arranged proximate to a bottom plate 2 which interconnects display panel 3 and rear wall 4. Each of these emitters is to provide a relatively small current so that many types of cathodes (cold or hot cathodes) are suitable as emitters. They may have a constant emission (at pulse width modulation) or a controllable emission (at amplitude modulation). The electron source arrangement 5 is arranged opposite entrance apertures of a row of electron transport ducts extending substantially parallel to the screen, which ducts are constituted by compartments 6, 6', 6", ... etc., in this case one compartment for each electron source. These compartments have cavities 11, 11', 11", ... defined by the rear wall 4 and partitions 12, 12', 12", ... At least one wall (preferably the rear wall) of each compartment is made of a material which has a suitable high electrical resistance in the longitudinal direction of the compartments for the purpose of the invention (for example, ceramic material, glass, synthetic material—coated or uncoated—) and which have a secondary emission coefficient δ>1 over a given range of primary electron energies. It is alternatively possible to construct (for example, the rear wall) from "isles" insulated from each other (in the longitudinal direction of the compartments) so as to obtain the desired high electrical resistance in the transport direction.

The electrical resistance of the wall material has such a value in the transport direction that a minimum possible total amount of current (preferably less than, 10 mA) will flow in the walls in the case of a field strength in the axial direction in the compartments of the order of one hundred to several hundred volts per cm required for the electron transport. A voltage Vt which generates the field strength required for the transport is present in operation between an upper rim 200 and a lower rim 201 of the rear wall 4. By applying a voltage of the order of several dozen to several hundred volts (value of the voltage is dependent on circumstances) between the row 5 of the electron sources and grids G1, G2 arranged at inputs of the compartments 6, 6', 6", . . . , electrons are introduced from the electron sources into the compartments. These electrons are accelerated by said field strength, whereafter they impinge upon the walls in the compartments and generate secondary electrons. The electrons can be withdrawn, for example row by row from the compartments via apertures 8, 8', . . . in a selection plate 10 energized by means of electrodes 9, 9', . . . (see FIG. 1A), and accelerated towards the luminescent screen 7 by means of an acceleration voltage applied in operation between the selection plate and the luminescent screen. Horizontal partitions 112, 112', 112", . . . are arranged between the display panel 3 and the selection plate 10. Instead of the partitions shown, it is alternatively possible to use apertured plates.

The display unit utilizes the aspect disclosed in European Patent Applications EP-A 0 400 750 and EP-A 0 436 997 that vacuum electron transport by means of secondary emission (hopping) within compartments having walls of electrically insulating material is possible if an electric field $(E_y)$ of sufficient power is applied in the longitudinal direction of the compartment. The contents of European Patent Applications EP-A 0 400 750 and EP-A 0 436 997 are herein incorporated by reference.

FIGS. 1A and 1B show the principle of a display unit operating with single selection (as described hereinbefore).

Figure 2A:
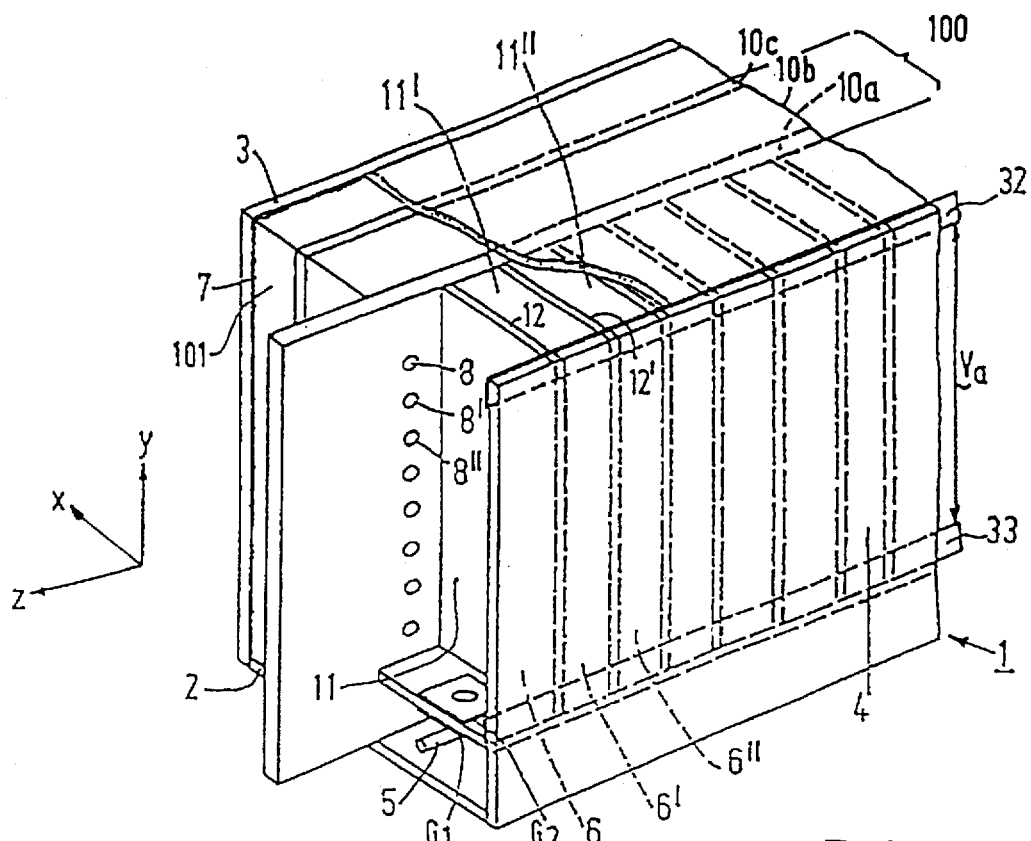
FIG. 2A is a diagrammatic perspective elevational view, partly broken away, of a display unit as can also be used in a picture display device, which display unit has a preselection and a fine selection.
Figure 2B:
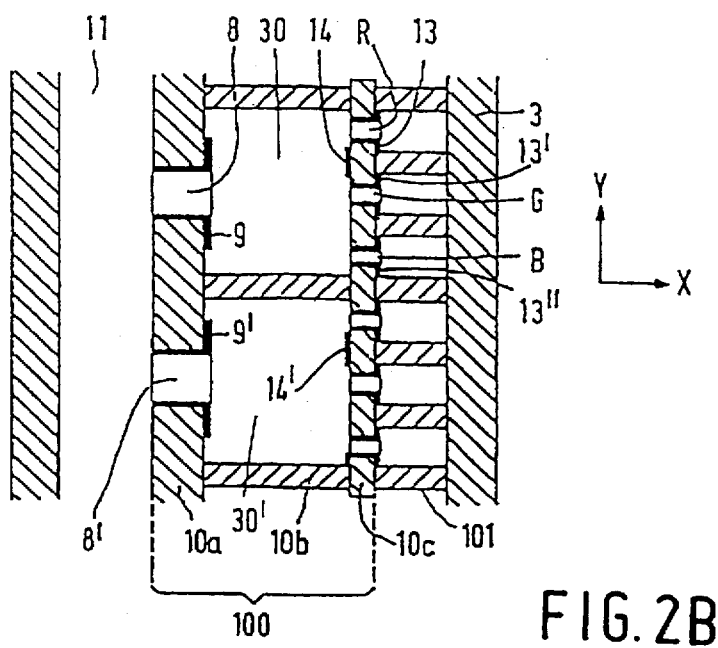
FIG. 2B is a cross-section through the display unit of FIG. 2A.

FIGS. 2A and 2B show the principle of stepped selection. Stepped selection is herein understood to mean that the selection from the compartments 6, 6', 6", . . . to the luminescent screen 7 is realised in at least two steps. A first (coarse) step for selecting, for example the pixels and a second (fine) step for selecting, for example the colour pixels. The space between the compartments and the luminescent screen 7, which is arranged on the inner wall of the display panel 3, accommodates an active colour selection system 100 which comprises an (active) preselection plate 10a, a spacer plate 10b and an (active) (fine-)selection plate 10c. Structure 100 is separated from the luminescent screen 7 by a flu-spacer structure 101, for example an apertured electrically insulating plate.

FIG. 2B shows in a diagrammatical cross-section a part of the picture display device of FIG. 2A in greater detail, particularly the active colour selection plate structure 100 which comprises a preselection plate 10a with extraction apertures 8, 8', 8", . . . and a fine-selection plate 10c with groups of apertures R, G, B. The apertures R, G, B are generally positioned in a triangle, but for the sake of clarity all three of them have been shown in the cross-section in FIG. 2B. Each extraction aperture 8, 8', etc. is associated with three fine-selection apertures R, G, B in this case. Other numbers are alternatively possible, for example 6 fine-selection apertures for each preselection aperture, etc. An intermediate spacer structure 10b is arranged between the preselection plate 10a and the fine-selection plate 10c. This structure accommodates communication ducts 30, 30', 30", . . . having a cross-section which is chosen to suit the shape of the phosphor colour pixels (for example, circular or triangular triplets).

The electron transport ducts 6, 6', 6", . . . are formed between the structure 100 and the rear wall 4. To be able to extract the electrons from the transport ducts 6, 6', 6", . . . via the apertures 8, 8', 8", . . . , pierced metal preselection electrodes 9, 9', 9", . . . are arranged on the screen-sided surface of the plate 10a.

The walls of the apertures 8, 8', . . . are preferably metallized completely or partly, but there is preferably no or little electrode metal on the surface of plate 10a on the side where the electrons land. This is done to ensure that no electrons remain on a selection electrode during addressing (i.e. the electrode must draw a minimal current).

Another solution to the problem of drawing current is to ensure that there is electrode metal on the selection surface where the electrons land, but this metal should be given such a large secondary emission coefficient that the preselection electrodes do not draw any net current.

Similarly as the plate 10a, the screen-sided surface of the apertured fine-selection plate 10c is provided with (fine-) selection electrodes 13, 13', . . . for realising, for example colour selection. Here again the apertures are preferably metallized completely or partly. The possibility of electrically interconnecting fine-selection electrodes is important in this respect. In fact, a preselection for each pixel has already taken place and, in principle, electrons cannot land at the wrong location (on the wrong pixel in this example). This means that, in principle, only one group or a small number of groups of three separate fine-selection electrodes is required for this form of fine selection. For example, the drive is effected as follows, but there are also other possibilities. The preselection electrodes are brought to a potential substantially linearly increasing with the distance to the electron source arrangement 5, for example, by means of a suitable resistance ladder.

One or more picture lines are selected by applying a positive voltage pulse of, for example 250 V to the desired preselection electrodes used for selecting these picture lines. Colour pixels are addressed by applying shorter pulses having an amplitude of, for example 350 V to the fine-selection electrodes. The fine-selection electrodes preferably have such an electrical resistance, or are connected to external resistors in such a way that they safeguard the electronic circuits (controlling the drive) against breakdown from the luminescent screen.

Figure 3:
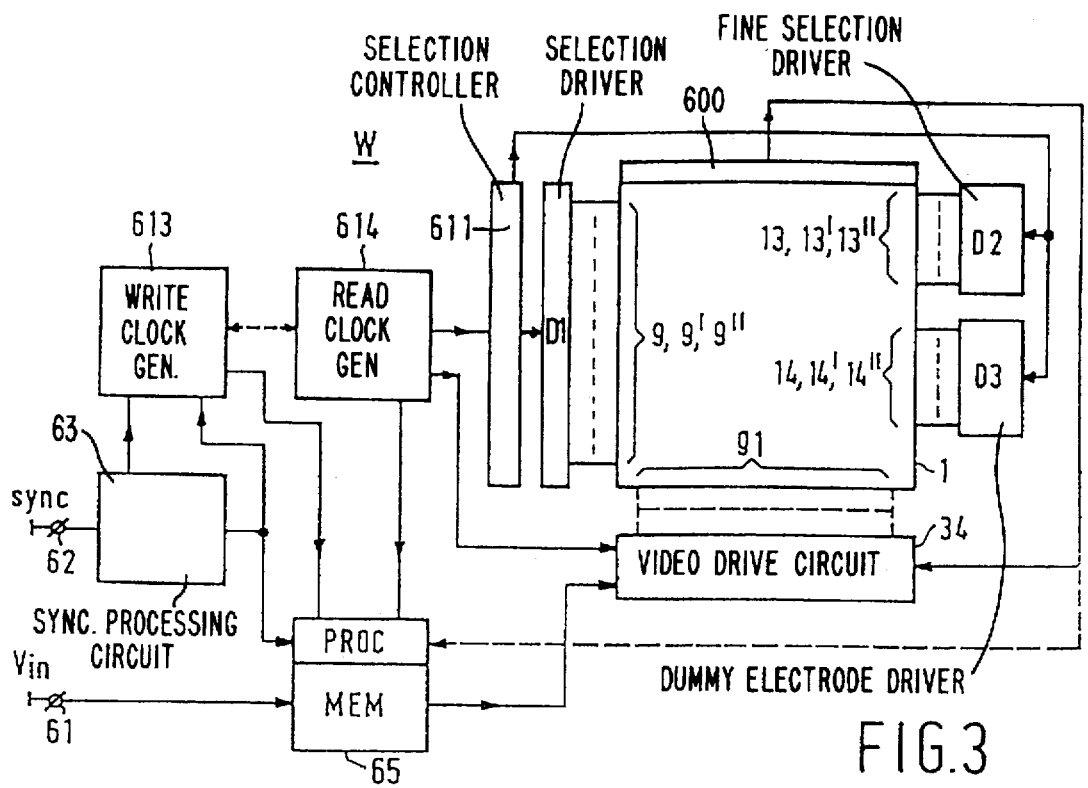
FIG. 3 shows block-diagrammatically an embodiment of a picture display device according to the invention.

FIG. 3 shows a picture display device W according to the invention. The display device receives an input video signal Vin at an input 61. The input video signal Vin is applied to a video signal processing circuit 65. The display device receives a synchronizing signal sync at an input 62. The input 62 is connected to a synchronization processing circuit 63. This synchronization processing circuit supplies synchronizing signals to a clock generator 613 and defines the television standard of the incoming video signal. The incoming video signal may comprise, for example, Y, U, V signals (or R,G,B signals). If the incoming video signal comprises Y, U, V signals, a conversion to R, G, B signals will have to take place in the video signal processing circuit 65 so that ultimately the different phosphors (red, green and blue) can be driven on the display panel 3. This conversion of Y, U, V signals to R, G, B signals may be effected by means of a matrix circuit. It is possible to carry out this conversion before the video signal is written into the memory MEM, or when the video signal is read from the memory MEM. The video signal is stored, for example, line-sequentially in the video signal processing circuit 65 under the control of a write clock which is generated, for example, by the clock generator 613. The video signal is supplied line by line (for example, for each colour line (R, G, B) in the case of a colour display screen) at an output of the video signal processing circuit under the control of a read clock which is generated by a clock generator 614 and is applied to the video drive circuit 34. In this video drive circuit the video information of, for example a (colour) line is written under the control of the clock generator 614 and subsequently applied in parallel to the G1 (or G2) electrodes which are arranged at the inputs of the compartments 6, 6', 6", . . . (see FIG. 1) of the display unit 1, after which the video information is displayed on the display panel 3. The lines are selected by means of a selection controller 611. This controller is controlled by a clock signal from the clock generator 614. After each clock pulse the selection driver D1 applies new drive voltages to the selection electrodes 9, 9', 9", ... (see also FIG. 1A) under the control of the selection controller 611. If the picture display device comprises a stepped selection, the selection controller 611 also drives a driver for the fine selection D2. This fine-selection driver D2 is then coupled to the fine-selection electrodes 13, 13', 13", ... If the picture display device comprises dummy electrodes 14, 14', 14", ... (to enhance the contrast), the selection controller 611 will also drive a dummy electrode driver D3. This dummy electrode driver drives the dummy electrodes 14, 14', 14", ... The selection controller receives the information about the drive voltages, for example from a look-up table or from an EPROM. The display unit 1 has a structure as described hereinbefore (see FIG. 1, 1A).

The synchronization processing circuit 63 defines the line frequency, the field frequency and, if the display device is suitable for displaying video signals of different TV standards and/or different aspect ratios, for example also the TV standard and the aspect ratio with reference to the incoming video signal.

The selection electrodes 9, 9', 9", ... must be driven by means of suitable voltages. These voltages may be subdivided into a bias voltage and a selection pulse. The bias voltage is used for transporting the electrons in the transport ducts along the non-selected selection electrodes. Successive selection electrodes may have a bias voltage which increases with their position across the length of the transport ducts. The selection pulse is a pulse having a height of, for example 300 V which is superimposed on the bias voltage for the selection electrode whose turn it is to extract electrons from the transport ducts.

Figure 4A:
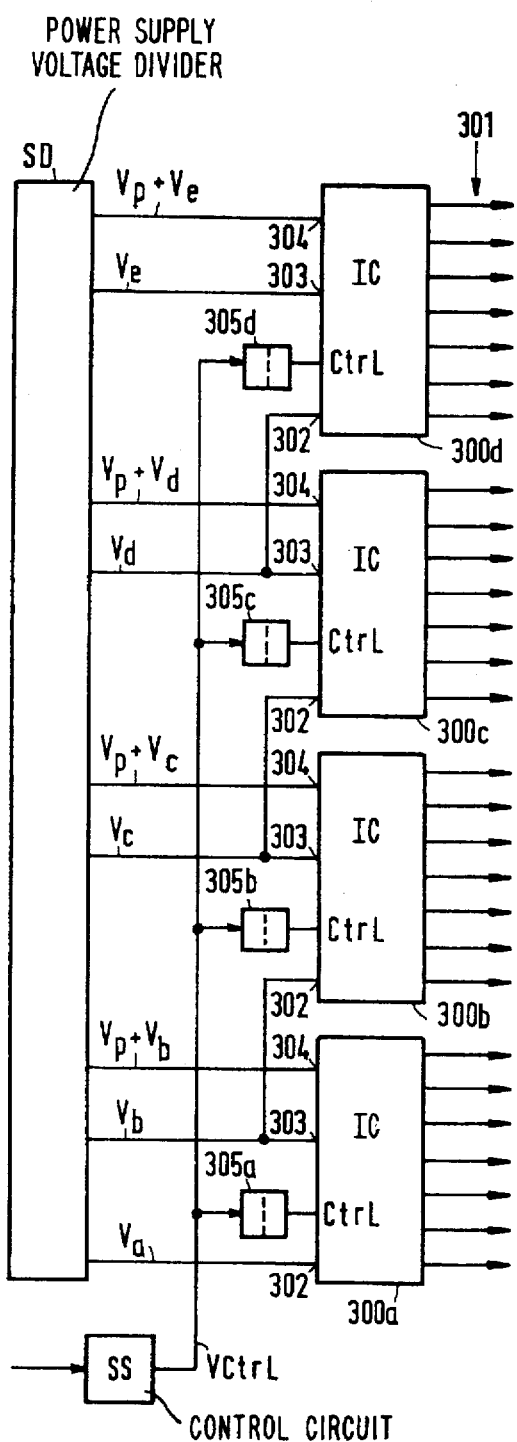
FIGS. 4a and 5 show a first and a second embodiment, respectively, of a selection driver for use in a picture display device according to the invention.

The selection driver of FIG. 4a comprises a plurality of ICs 300 which are cascaded as regards their power supply voltage, each having a plurality of outputs 301 for connection to the selection electrodes 9. For the sake of simplicity, FIG. 4a shows four ICs (300a, 300b, 300c and 300d) each having seven outputs. However, a practical picture display device has a very large number of selection electrodes, for example 512 and then, for example 16 ICs each having 32 outputs can be used. As regards their power supply voltages, the ICs are cascaded, i.e. each power supply terminal of an IC is at a higher voltage level than the corresponding power supply terminal of the adjacent, lower IC in the cascade. The ICs of FIG. 4a have three power supply terminals 302, 303 and 304 each. The power supply terminal 302 receives a low bias voltage, the terminal 303 receives a high bias voltage and the terminal 304 receives the high bias voltage plus a pulse height voltage Vp. The lowest IC 300a receives a low bias voltage Va at the terminal 302, a high bias voltage Vb at the terminal 303 and the voltage Vb+Vp at the terminal 304. In the embodiment of FIG. 4a the low bias voltage of an IC is equal to the high bias voltage of the adjacent, lower IC. The terminal 302 of the IC 300b thus receives the high bias voltage Vb from IC 300a. Moreover, the terminal 303 of IC 300b receives a high bias voltage Vc and the terminal 304 receives the voltage Vp+Vc. This applies to all other ICs. All power supply voltages originate from a power supply voltage divider SD. In the above-mentioned numerical example, with 16 ICs having 32 outputs each, the high bias voltage of an IC may be 6*32=192 V higher than the low bias voltage so that the bias voltage increases by $\Delta V=6$ V per selection electrode. The pulse height voltage is 300 V.

Thus, at Va=0 V the terminals 302 receive the voltages 0, 192, 384, ... 2880 V, respectively, the terminals 303 receive the voltages 192, 384, ... 3072 V and the terminals 304 receive the voltages 492, 682 ... 3372 V.

It is to be noted that the maximum power supply voltage across each IC is equal to the voltage at terminal 304 minus the voltage at terminal 302 (Vp+Vb−Va=Vp+Vc−Vb=etc.) i.e. equal to the pulse height voltage Vp plus the bias voltage gradient per IC. In the above-mentioned numerical example this is 492 V which is the voltage that the IC should be able to withstand. If ICs having a higher maximum voltage are used, the number of ICs may be reduced (by more outputs per IC) and if ICs having a lower maximum voltage are used, a larger number of ICs should be incorporated in the cascade (with a smaller number of outputs per IC).

In a manner to be described hereinafter, the ICs 300 generate selection pulses at their outputs 301 at a pulse height Vp and a bias level which, for each IC output 301 is higher by the value of $\Delta V$ of, for example 6 V than that of the adjacent, lower IC output. Consequently, the bias level of the IC outputs then increases by 6 V per output.

All selection pulses which are supplied by the outputs of the ICs should be generated consecutively, for example, first at the lower output of the lower IC 300a, then at the second lower output of the lower IC, and so forth. After the upper output of the lower IC 300a, the lower output of IC 300b is to supply a selection pulse. This continues until it is ultimately the turn of the upper output of the upper IC. Scanning of the selection electrodes then proceeds from bottom to top. It is of course alternatively possible and more conventional for scanning to be effected from top to bottom. The instant of generating the selection pulses is defined by a control signal which is supplied by a control circuit SS present in the selection controller 611 to control inputs Ctrl of the respective ICs. This control signal may comprise an address for each IC output whose turn it is to supply a selection pulse. It should be noted that the control signal has a low information density because only the address of the selection electrode which is active is to be transmitted. The addresses of the selection electrodes to be activated are previously programmed in software or hardware in the IC. As is shown diagrammatically, this relatively small number of control signals is passed on from ground level to the various ICs with their distinct DC levels. To this end a DC isolation 305a ... 305d is incorporated before each Ctrl input, for example a separating transformer or a series capacitor or an optocoupler (either or not via a glass fibre) or a piezotransformer.

Figure 4B:
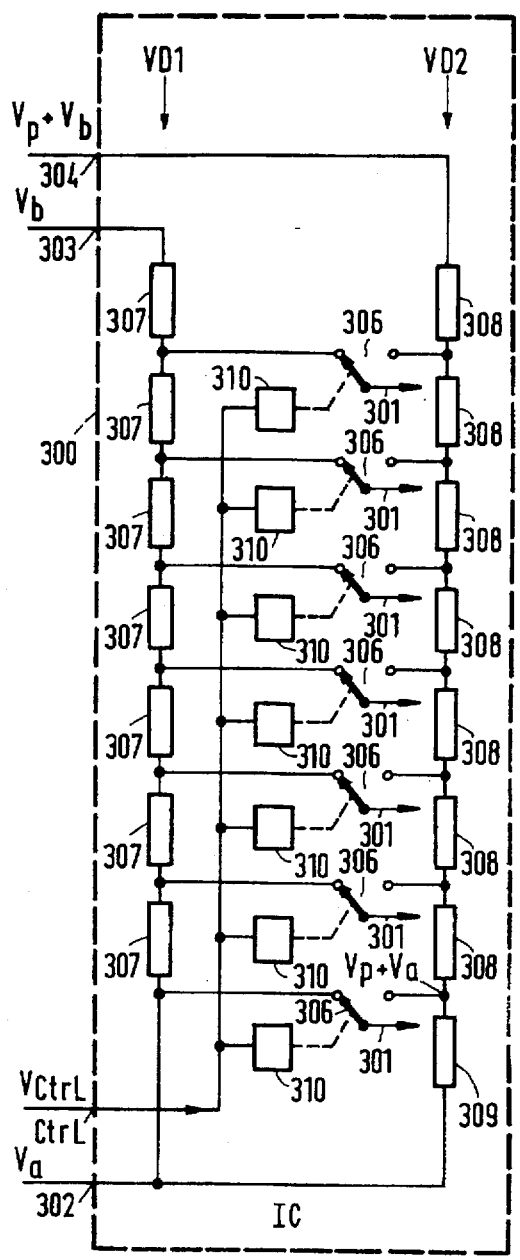
FIG. 4b shows an embodiment of an integrated driver circuit for use in the selection driver of FIGS. 4a and 5, FIGS. 6a and 7 show a third and a fourth embodiment, respectively, of a selection driver for use in a picture display device according to the invention.

FIG. 4b shows an embodiment of the internal circuit of the ICs 300. Selection driver output stages, diagrammatically shown by electronic change-over switches 306, alternately connect the outputs 301 to taps of a first voltage divider VD1 composed of mutually equal resistors 307 and to taps of a second voltage divider VD2 composed of mutually equal resistors 308 and a resistor 309. The first voltage divider is arranged between the terminals 303 and 302 and the second is arranged between the terminals 304 and 302. The resistors are dimensioned in such a way that the pulse height voltage Vp is present across the resistor 309. Thus the voltage Vb−Va occurs across the joint resistors 308 as well as across the joint resistors 307. The change-over switches 306 most often connect the outputs 301 to the taps of the first voltage divider VD1 and thus apply a bias voltage to these outputs which increases with voltage increments $\Delta V$ from Va to Vb−$\Delta V$. For supplying a selection pulse at an output, the relevant change-over switch is switched and sets the output at a voltage which is equal to the bias voltage associated with this output supplemented with the pulse voltage Vp. The change-over switches 306 are controlled by address units 310 to which the control signal Ctrl is applied. Each address unit responds to a unique address and when the control signal supplies the relevant address, the address unit switches the associated change-over switch so that the associated output is connected to the second voltage divider. As soon as the control signal supplies a new address, said change-over switch switches back to the first voltage divider again.

Figure 5:
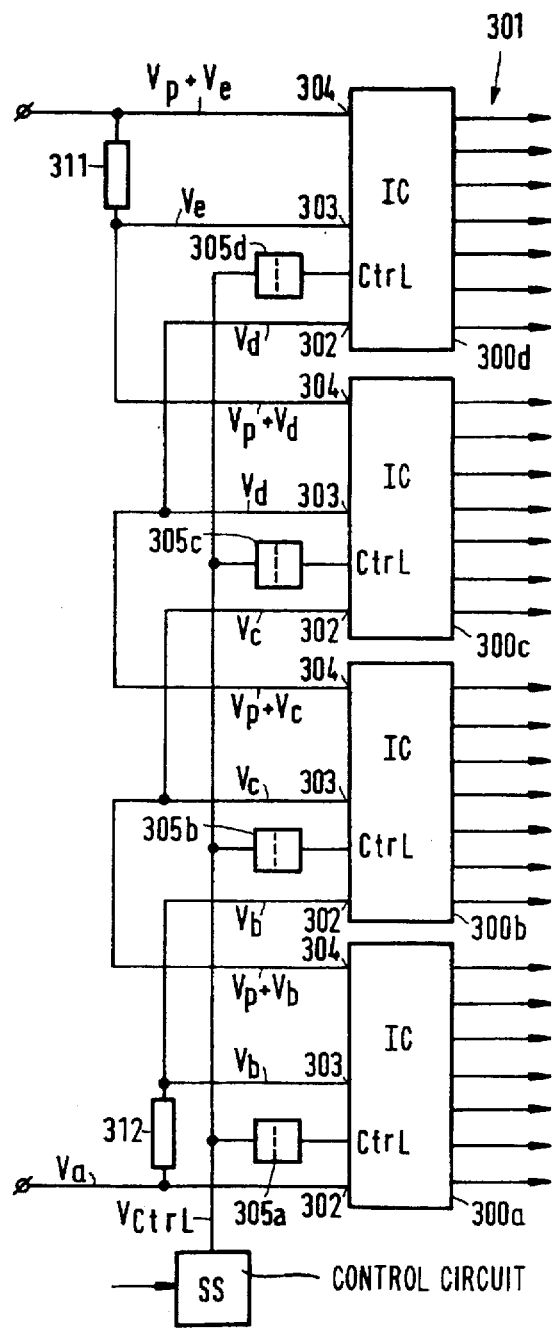

In the selection driver of FIG. 5, elements corresponding to those in FIG. 4a are denoted by the same references. The advantage of this selection driver is that the power supply voltage divider SD of FIG. 4a is now superfluous. Similarly as with the selection driver of FIG. 4a, the power supply terminal 302 for the low bias voltage of an IC is connected to the power supply terminal 303 for the high bias voltage of the adjacent, lower IC. However, now the power supply terminal 304 of an IC is also connected to the terminal 303 of the adjacent, higher IC. The terminal 303 of an IC having ordinal number n and the terminal 304 of the IC having ordinal number n−1 are now fed from the terminal 302 of the IC having ordinal number n+1. If all ICs 300 are to be maintained identical as regards their internal circuitry, an extra resistor 311 is to be arranged between the terminals 303 and 304 of the highest IC so as to compensate for the lack of current supply from a higher IC, and a further resistor 312 should be arranged between the terminals 303 and 302 of the lowest IC so as to compensate for the lack of current depletion to a lower IC.

A limitation of the selection driver of FIG. 5 is that the pulse height voltage Vp is equal to the difference in the high and low bias voltage of an IC. In other words, a voltage halfway the total bias and pulse height power supply of the IC is present across the terminal 303 of an IC. As it were, the IC "hangs" halfway between the upper and the lower IC. The external power supply now only needs to supply the total voltage of the whole circuit, while the intermediate levels are derived therefrom by the ICs themselves.

The internal circuit of the ICs of FIG. 5 may be equal to that shown in FIG. 4b, on the understanding that the resistor 309 should have a value which is equal to the total series arrangement of the resistors 308. Moreover, if the value of the total series arrangement of the resistors 307 is equal to that of the resistor 309, the value of the resistor 312 will be equal to that of the resistor 309 and the value of the resistor 311 will be equal to half the value of the resistor 309.

It is to be noted that both in the selection driver of FIG. 4a and in that of FIG. 5 the two voltage dividers VD1 and VD2 of the IC 300 can be combined to a single voltage divider then having of course the correct taps for connection of the two switching contacts of all change-over switches 303. However, a drawback then is that the IC 300 will have more crossing connections than in the case in which two separate voltage dividers are used.

Figure 6A:
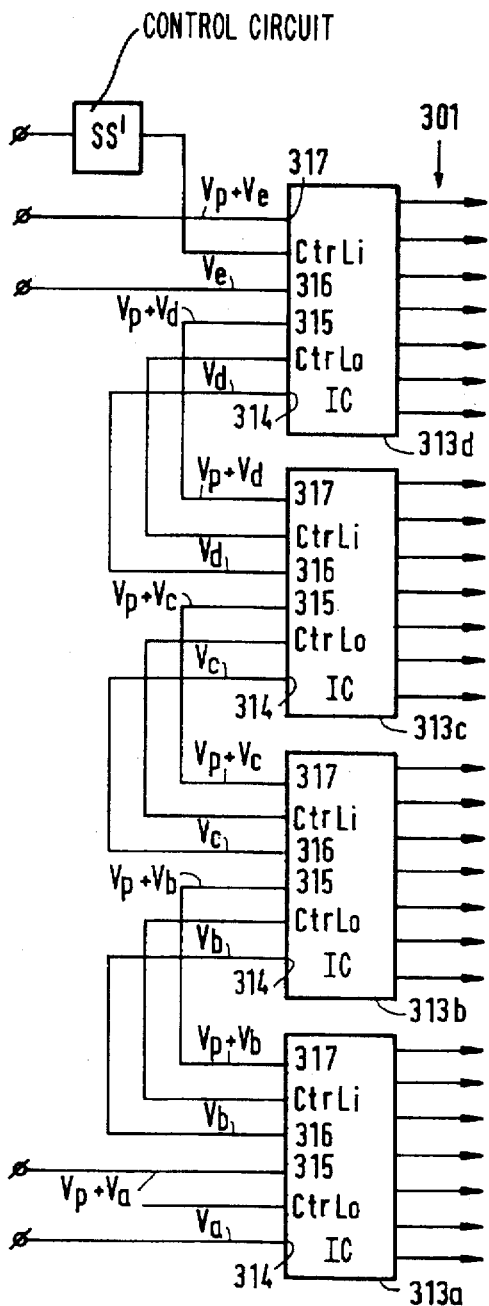
FIG. 6b shows an embodiment of an integrated driver circuit for use in the selection drivers of FIGS. 6a and 7.

Similarly as the selection driver of FIG. 5, the selection driver of FIG. 6a does not need a power supply voltage divider SD and, moreover, it is not bound to the limitation of FIG. 5 where the bias voltage gradient per IC (Vb−Va) should be equal to the pulse height voltage Vp. The selection driver of FIG. 6a again comprises a plurality of cascaded integrated driver circuits 313a, 313b . . . each having a plurality of outputs 301. Each of these ICs 313 has a power supply terminal 314 for the low bias voltage, a power supply terminal 315 for the low bias voltage plus the pulse height voltage, a power supply terminal 316 for the high bias voltage and a power supply terminal 317 for the high bias voltage plus the pulse height voltage.

Figure 6B:
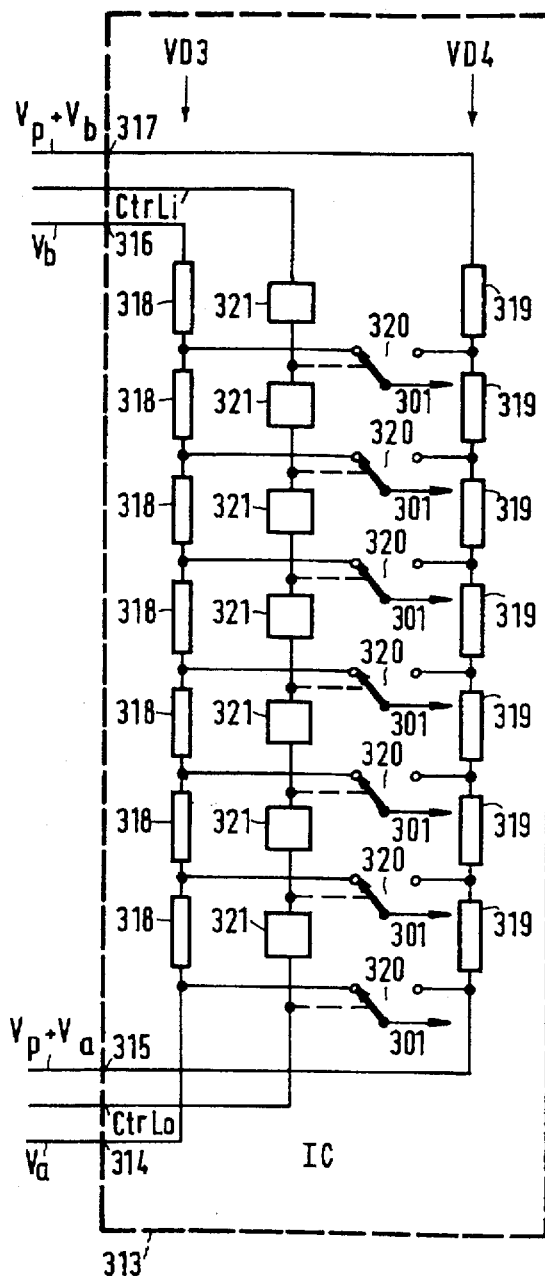

FIG. 6b shows a possible internal circuit of the IC 313. Again, the IC comprises two voltage dividers VD3 and VD4. The voltage divider VD3 comprises a number of series-arranged resistors 318 between the power supply terminals 316 and 314 and the voltage divider VD4 comprises an equally large number of series-arranged resistors 319 between the power supply terminals 317 and 315. Electronic change-over switches 320 alternately switch the outputs 301 to taps on the voltage divider VD3 and to corresponding taps on the voltage divider VD4. It follows from FIGS. 6a and 6b combined that the voltage dividers VD3 of all ICs are arranged in series between the power supply terminal 316 (Ve) of the highest IC and the power supply terminal 314 (Va) of the lowest IC. Likewise, the voltage dividers VD4 of all ICs are arranged in series between the power supply terminal 317 (Vp+Ve) of the highest IC and the power supply terminal 315 (Vp+Va) of the lowest IC. The electronic change-over switches 320 switch between a bias voltage (no selection pulse) defined by the relevant tap on the voltage divider VD3 and the same bias voltage plus the pulse height voltage Vp (selection pulse) defined by the corresponding tap on the voltage divider VD4. The bias voltage of each output 301 has a given amount $\Delta V$ which is equal to the voltage drop across each resistor 318 and 319, higher than the bias voltage of the adjacent, lower output 301. This applies to the outputs of an IC itself as well as to two adjacent outputs of two adjacent ICs. For the purpose of illustration, the same numerical example as in FIG. 4 may be used, in which the number of outputs per IC is 32 and the number of ICs is 16 so that 32*16=512 selection electrodes can be driven. For a bias voltage gradient of 6 V per selection electrode, a bias voltage per IC (Vb−Va) of 32*6= 192 V is necessary and a total bias voltage (Ve−Va) of 16*192=3072 V is necessary. At a customary selection pulse height of 300 V, the voltage Vp+Ve will then be 3372 V. It is to be noted that the terminals 316 of the highest IC 313d can be fed from the Vp+Ve supply at the terminal 317 by means of an external resistor having such a value that there is a voltage drop Vp across it. Alternatively, the Vp+Va supply of the terminal 315 of the lowest IC 313a may be replaced by a resistor of the correct value, arranged between the terminals 315 and 314 of this IC.

In the embodiments of FIGS. 6a and 6b the cascaded ICs are cascaded not only as regards their power supply voltage, but also as regards the control signals. To this end, the ICs 313a, 313b . . . each have an input terminal Ctrli for the control signals and an output terminal Ctrlo. The control signals are applied in the form of a single pulse from a control circuit SS' present in the selection controller 611 to the Ctrli terminal of the upper IC 313d. This pulse is applied in the IC to a cascade of delay and level shifting devices 321. In this device 321 the pulse is delayed by for example 30 μs and shifted by the level $\Delta V$ and subsequently the delayed and shifted pulse is applied to the upper change-over switch 320. As a result, this change-over switch generates a selection pulse of, for example 30 μs at its output. The delayed and shifted pulse is also applied to a further device 321 from which the subsequent change-over switch 320 is controlled so that a selection pulse is generated at its output, and so forth. When the last (lower) output of IC 313d generates a selection pulse of 30 μs, a pulse is also applied to the Ctrli input of the IC 313c via the output Ctrlo. The above-described process is repeated there until all outputs of all ICs have supplied a selection pulse. The transmission of the control signals via the delay and level shifting devices 321 is preferably effected under the control of clock pulses. These clock pulses may be transmitted in a manner not shown in cascade from one IC to the other, while the necessary level shifts take place in the ICs again. In that case no delay elements are provided for the clock pulse transmission so that all ICs receive the clock pulses (substantially) simultaneously.

Since in the embodiment of FIG. 6 the row scanning proceeds from top to bottom, the control signals originating from the control circuit SS' must be applied to the Ctrli input of the upper IC 313d which is at a high bias voltage. This implies that an expensive DC separation is necessary between the circuit SS' and the Ctrli input of the IC 313d. An alternative possibility is to provide each IC with two extra connections via which the control signals are passed from the lower to the upper IC, while a level shift which is equal to the bias voltage gradient per IC is effected in each IC. This upward transport of the control signals may theoretically take place without any delay, but since some delay is substantially inevitable and the total delay of the signals is to be defined, this upward transport is preferably also controlled by clock pulses in which the control signals are transported, for example one IC further per clock pulse.

The cascading of the control signals as shown with reference to FIGS. 6a and 6b may of course also be realised in the embodiments of FIGS. 4, 4a and/or 5, while the address control shown in these Figures may be used in the embodiment shown in FIGS. 6, 6a.

The selection driver of FIGS. 6a and 6b has the advantage that it is very flexible. The height of the selection pulses is no longer bound to the structure of the ICs and to the value of the bias voltages but may be adjusted independently thereof by means of the voltages Vp+Va and Vp+Ve to be externally applied and said external resistors, respectively. Since the bias voltage gradient per selection electrode is generally independent of the size of the display (a larger display requires more transport voltage but has also a larger number of selection electrodes), the selection driver can be simply adapted to the size of the display by modifying the number of cascaded ICs.

In the description of FIGS. 4, 5 and 6 it has been tacitly assumed that the selection electrodes do not noticeably load the selection drivers. However, in practice the selection electrode is a considerable capacitive load for the selection driver. During the leading edge of a selection pulse, a current of, for example 100 mA flows in the selection electrode and during the trailing edge of the pulse this current flows back again. It is therefore desirable to implement the selection driver at a sufficiently low impedance so that it is capable of coping with the comparatively large selection currents.

Figure 7:
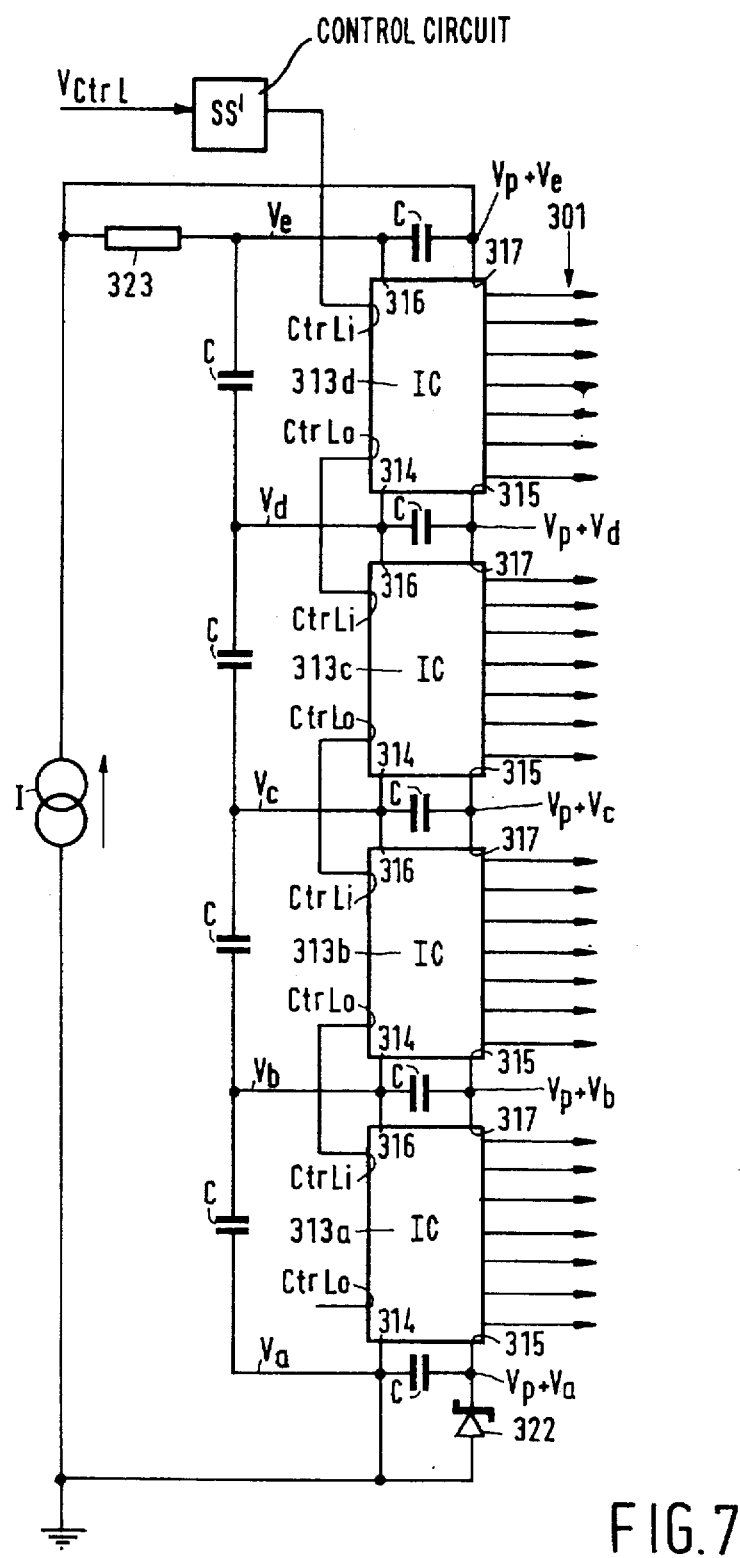

A measure of achieving this is to replace the resistors constituting the integrated voltage dividers by elements having a lower impedance such as diodes and preferably zener diodes. If the resistors 307 and 308 of FIG. 4b and the resistors 318 and 319 of FIG. 6b are replaced by zener diodes having a zener voltage of, for example 6 V, the desired low impedance is obtained by passing a sufficiently high quiescent current through the voltage dividers. Moreover, the desired bias voltage gradient of 6 V per selection electrode is then naturally present. The use of zener diodes is accompanied by several adaptations which will be elucidated with reference to FIG. 7. The ICs 313 of this Figure are equal to those of FIGS. 6a and 6b, on the understanding that the elements 318 and 319 of FIG. 6b are zener diodes having a zener voltage of, for example 6 V. A zener diode (or a series arrangement of zener diodes) 322 having a zener voltage which is equal to the desired pulse height voltage Vp (for example 300 V) is arranged between the terminals 315 and 314 of the lower IC 313a. The selection driver of FIG. 7 is fed from a current source I which is connected to terminal 317 of the upper IC 313d and to the terminal 316 of this IC via a resistor 323. Similarly as in FIG. 6a, the other ICs are each fed from the next higher IC. The circuit is now fed with current because the integrated zener diodes 318 and 319 and the external zener diode 322 provide the correct voltages.

A measure by which the power dissipation of the circuit can be reduced considerably is to arrange external decoupling capacitors parallel across the integrated voltage dividers and/or between the voltage dividers of an IC. As is shown in FIG. 7, decoupling capacitors C are arranged between the terminals 314 and 316 and between the terminals 316 and 317 of each IC 313. Moreover, a decoupling capacitor C is arranged between the terminals 314 and 315 of the lower IC 313a. Due to this measure the ICs 313 which have been cascaded for power supply voltage are decoupled from each other for alternating voltage. The relatively large load currents which flow to and from a selected selection electrode are then supplied and taken up, respectively, by the decoupling capacitors connected to the relevant IC and need not flow through the voltage dividers of the other ICs which do not participate in the selection process at that moment. Consequently, the quiescent current through these voltage dividers and hence the power dissipation may remain much smaller. It is to be noted that both the use of zener diodes instead of resistors in the integrated driver circuits, and the decoupling of these driver circuits for alternating current by way of decoupling capacitors may alternatively be used in other selection drivers such as are shown in FIGS. 4 and 5.

In spite of the fact that the decoupling of the ICs for alternating current leads to a considerable reduction of the power dissipation, a too large dissipation still remains because the voltage dividers in the IC supplying selection pulses must convey the charge and discharge currents to and from the selection electrodes. In fact, as soon as, for example the upper change-over switch 320 switches over in the integrated driver circuit of FIG. 6b, the charge current for the relevant selection electrode capacitance flows from the decoupling capacitors connected to terminal 317 through the upper zener diode 319 to said change-over switch and as soon as this change-over switch switches back again, the discharge current of the selection electrode capacitance flows to the coupling capacitors connected to the terminal 314 via the change-over switch and all but the upper one of the zener diodes 318. As soon as subsequently the second highest change-over switch 320 switches over, a charge current again flows through the upper two zener diodes 319 and when the change-over switch switches back, a discharge current flows now through all zener diodes 318 but the upper two, and so forth. This produces much power dissipation; FIGS. 8 and 9 propose a method of reducing this dissipation.

Figure 8A:
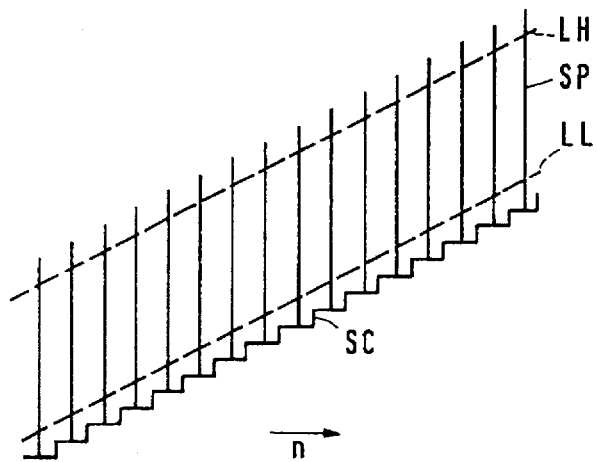
FIG. 8 shows some curves to explain the operation of the embodiment of FIG. 9.
Figure 8B:
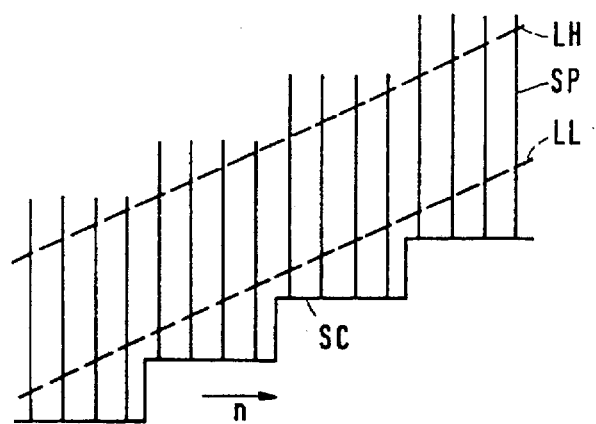
Figure 9:
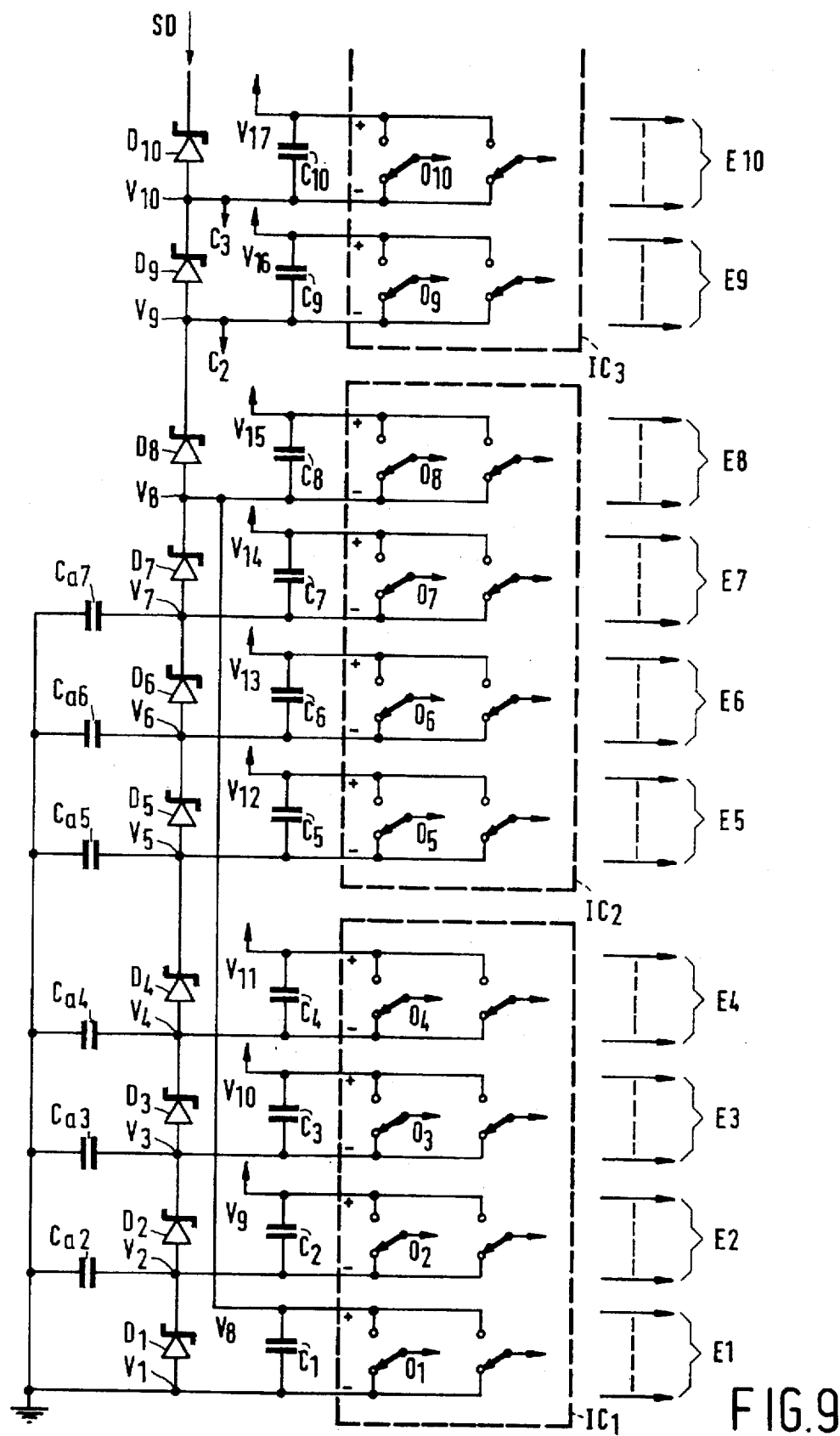
FIG. 9 shows a fifth embodiment of a selection driver for use in a picture display device according to the invention.

FIG. 8a shows a square-wave curve SC which represents the bias (transport) voltage at a plurality of consecutive selection electrodes 9 as a function of the ordinal number n of the selection electrodes. Vertical line sections SP represent the selection pulses which are superimposed on the bias voltage, the height of the line sections SP representing the height of the selection pulses. While the bias voltage is a DC voltage which is continuously present across each selection electrode, the selection pulses are not simultaneously but consecutively present. The selection pulses would have to be represented by one line section which goes down (or climbs) the square-wave curve SC step by step.

A dotted line LL represents the voltage level of the selection electrodes at which no (or substantially no) electrons are extracted from the electron transport ducts and a second dotted line LH represents the voltage level at which all (or substantially all) electrons are extracted from the electron transport ducts. The two dotted lines LL and LH rise with an increasing selection electrode ordinal number n. The square-wave curve SC should of course be situated completely below the dotted line LL so as to ensure that all the selection electrodes to which no selection pulse is applied do not extract (substantially) any electrons from the electron transport ducts, while the line sections SP should project above the dotted line HL so that the one selection electrode to which a selection pulse is applied extracts (substantially) all electrons from the electron transport ducts.

The circuit of FIG. 9 is based on the recognition that it is not necessary for a satisfactory transport of the electrons in the electron transport ducts that each selection electrode has a higher bias voltage than the next lower selection electrode. In other words: each "step" of the square-wave curve SC may comprise a group of a plurality of juxtaposed selection electrodes. A square-wave curve with larger steps is then obtained, which should of course still be situated completely below the dotted line LL (see FIG. 8b). The selection pulses (the line sections SP) should of course be higher than in the case of FIG. 8a because they must continue to project above the dotted line LH. It is to be noted that the size of such a group of selection electrodes having an equal bias voltage is limited. If such a group is chosen to be too large, the electron transport in the electron transport ducts is influenced and the variation of the portions of the selection pulses projecting above the dotted line LH is too large so that a visible horizontal pattern may be produced on the display screen. Moreover, the required selection pulse height Vp increases. Provisional experiments give rise to the assumption that the optimum size of a group of selection electrodes is the size at which the step height of the square-wave curve SC is approximately 50 V. At a bias voltage gradient of 6 V per selection electrode, 8 selection electrodes per group are then used. The groups of selection electrodes are diagrammatically denoted by E1, E2 . . . in FIG. 9. Since a selection electrode output stage is connected to each selection electrode, the output stages may also be subdivided into groups (O1, O2 . . . ), each group of output stages O corresponding to a group of selection electrodes E.

It is of course possible to incorporate each of the groups of output stages in one IC, but then the number of ICs will be very large (64). Consequently, a number of groups of output stages which is cascaded as regards the power supply voltage is preferably incorporated in one IC. Since all groups of output stages are cascaded as regards the power supply voltage, the ICs themselves are also cascaded.

The embodiment of FIG. 9 shows the output stage as electronic change-over switches. For the sake of simplicity, two change-over switches are shown in each output stage group, but in practice a larger number of change-over switches may be incorporated in a group, for example, as already stated above, 8. The first group of change-over switches O1 then energizes the first group of selection electrodes E1 with the electrodes 1 to 8, the second group of change-over switches energizes the second group of selection electrodes E2 with the electrodes 9 to 16, and so forth. The change-over switches of each group O connect their respective outputs to a low power supply terminal (−) which is common for all change-over switches of the group and to a high power supply terminal (+) which is also common for all change-over switches of the group.

A power supply voltage divider SD comprises a plurality of series-arranged zener diodes D1, D2 . . . The low power supply terminal (−) of the first group O1 is connected to ground, that of the second group O2 is connected to the tap between the zener diodes D1 and D2, that of the third group is connected to the tap between the zener diodes D2 and D3, and so forth. Each zener diode D1, D2 . . . has a zener voltage which is equal to the desired supply voltage difference between two juxtaposed groups of change-over switches. At a desired bias voltage gradient of 6 V per electrode and when each group E comprises 8 selection electrodes, the zener voltage of each diode D1, D2 . . . will be 8*6 V=48 V.

The high power supply terminal (+) of the group O1 is connected to the tap between the zener diodes D7 and D8. Similarly, the high power supply terminal of the group O2 is connected to the tap on the zener diodes D8 and D9, that of group O3 is connected to the tap between the zener diodes D9 and D10, and so forth; these connections are not completely shown in FIG. 9. The + terminal of each group O is thus connected 7 diodes higher than the − terminal. Hence, the high power supply voltage of each group O is seven times the zener voltage, i.e. 7*48=336 V higher than the low power supply voltage of this group and consequently a pulse voltage of 336 V is superimposed on the bias voltage (the − power supply voltage) of the relevant group when one of the change-over switches of a group O is switched over.

The groups O1 to O4 are accommodated in an integrated driver circuit IC1, the groups O5 to O8 are accommodated in a second integrated driver circuit IC2, and so forth. Each IC thus serves 4*8=32 selection electrodes. If 16 ICs are cascaded, 16*32=512 selection electrodes are driven. The power supply voltage divider SD then comprises 4*16 zener diodes plus 7 zener diodes for supplying the high power supply voltage to the 7 highest groups, i.e. a total of 71 zener diodes. The total required power supply voltage then is 71*48 V=3408 V. This voltage is supplied by a current source not shown (or a voltage source with a series resistor) which is connected to the upper zener diode and must be able to produce the required quiescent current for the zener diodes and the DC power supply current for the cascaded ICs.

The power supply voltage of an IC is equal to the pulse height voltage plus the bias voltage gradient per group, multiplied by the number of groups per IC minus one. In the numerical example given above, this is:

$$336\ V + 48\ V * (4-1) = 480\ V$$

If the IC cannot withstand this voltage and if the pulse height voltage cannot be decreased, a smaller number of groups per IC and/or a smaller bias voltage gradient per group, hence fewer selection electrodes per group should be chosen. In both cases this involves a larger number of ICs in the cascade.

The mode of driving the electronic change-over switches in such a way that each selection electrode receives a selection pulse in time is not further shown in FIG. 9 but may be effected in the same manner as has been shown in any one of FIGS. 4a to 6b.

Similarly as in the cascaded ICs of FIG. 7, it is also important for the cascaded groups O of FIG. 9 to realise a decoupling for alternating current of the groups by means of decoupling capacitors. This may be effected, for example by arranging a decoupling capacitor parallel across each zener diode D. A drawback of this topology is that the charge currents for a given group of selection electrodes should be supplied by a plurality of series-arranged decoupling capacitors (7 in the example shown) which should also supply charge currents for other groups of selection electrodes. The groups among themselves are then certainly not decoupled in an optimal way. As is shown in FIG. 9, this drawback is obviated by arranging a decoupling capacitor (C1, C2, ...) between the + and the − power supply terminals of each group (O1, O2 ...). This is accompanied by more stringent requirements to be imposed on the capability of the decoupling capacitors to withstand the voltage, because the capacitors C1, C2 ... must each be able to withstand a voltage of, for example seven times the zener voltage, while the decoupling capacitors parallel to the zener diodes should be able to withstand only once the zener voltage.

Another aspect of the way of decoupling shown in FIG. 9 is that a plurality of different series arrangements (7) is obtained instead of one large series arrangement of decoupling capacitors. In fact, the capacitors C1, C8, C15, C22 etc. are arranged in series, likewise as the capacitors C2, C9, C16, C23, etc. up to and including the series arrangement C7, C14, C21, C28 etc. To guide the charge and discharge current via ground, each of these series arrangements (with the exception of the first which is already connected to ground) is separately connected to ground via a capacitor Ca2, Ca3 to Ca7.

The zener diodes of the voltage divider SD may be replaced by resistors, which may necessitate some form of internal overvoltage protection within the ICs because the protection supplied by the zener diodes is then eliminated. The voltage divider SD may alternatively be split up into two voltage dividers, one for the low bias voltages of the groups O and one for the high bias voltages, i.e. in a corresponding way as is shown in FIGS. 6b and 7 for the integrated voltage dividers VD3 and VD4.

We claim:

1. A picture display device having a selection structure for controlling the passage of electrons via extraction locations which communicate row by row with electron transport ducts and with selection electrodes associated with the extraction locations and being coupled to a selection driver, characterized in that the selection driver comprises a plurality of integrated driver circuits each having outputs for selectively supplying selection pulses, each output being DC-connected to a respective selection electrode, and in that the integrated driver circuits are cascaded as regards respective power supply voltages in such a way that the bias voltage required for the electron transport in the transport ducts is also applied to the connected selection electrodes;

said integrated driver circuits each having a control signal input for supplying control signals which control the instant of occurrence of the selection pulses at the outputs of the integrated driver circuits; and said integrated driver circuits being cascaded as regards the control signals and having control signal outputs for supplying delayed and DC-offset control signals to the control signal input of the integrated driver circuit which is next in the cascade.

2. A picture display device as claimed in claim 1, characterized in that each integrated driver circuit comprises at least one integrated voltage divider and in that bias voltages applied to the selection electrodes are generated partly by power supply voltages applied to the integrated driver circuit via power supply terminals and partly by the integrated voltage divider.

3. A picture display device as claimed in claim 1, characterized in that the outputs of the integrated driver circuits are subdivided into a plurality of groups of output stages, the output stages associated with one group applying mutually equal bias voltages to a group of consecutive selection electrodes, and consecutive groups of output stages deriving consecutive values of bias voltages from power supply terminals and applying said values to consecutive groups of selection electrodes.

4. A picture display device as claimed in claim 3, characterized in that each integrated driver circuit comprises a plurality of groups of output stages which are cascaded as regards bias voltages applied to said circuits.

5. A picture display device as claimed in claim 2 or 3, characterized in that said power supply terminals of the integrated driver circuits are decoupled for alternating current by means of decoupling capacitors.

6. A selection driver for use in a picture display device as claimed in claim 1, comprising integrated driver circuits which are cascaded as regards their power supply voltage.

7. An integrated driver circuit for use in a picture display device as claimed in claim 1, comprising switching means for generating selection pulses and an input terminal (Ctrli) for supplying control signals controlling the switching means.

8. A picture display device having a selection structure for controlling a passage of electrons via extraction locations which communicate row by row with electron transport ducts and with selection electrodes associated with the extraction locations and being coupled to a selection driver, the selection driver comprising a plurality of integrated driver circuits each having:

a. a plurality of outputs for supplying a respective plurality of output voltages, each output being coupled to a corresponding selection electrode;

b. a first input for receiving a first supply voltage;

c. a second input for receiving a second supply voltage having a value higher than the first supply voltage;

d. a voltage division means being coupled between the first and second inputs for generating a plurality of bias voltages from the first and second supply voltages;

e. a third input for receiving a third supply voltage having a value higher than the second supply voltage; and f. selection means being coupled to receive the plurality of bias voltages and the third supply voltage for supplying the plurality of output voltages, whereby the selection means supply one out of the plurality of bias voltages or a selection voltage being dependent on the third supply voltage to a corresponding one of the selection electrodes.

* * * * *